Feb. 17, 1970 L. W. LOWRANCE 3,496,557

SYSTEM FOR REPRODUCING RECORDED DIGITAL DATA AND RECOVERING DATA PROPER AND CLOCK PULSES

Filed Feb. 1, 1967 2 Sheets-Sheet 1

INVENTOR:
L. Wayne Lowrance
By Smyth, Roston & Pavitt
ATTORNEYS

INVENTOR:
L. Wayne Lowrance
By Smyth, Roston & Pavitt
ATTORNEYS 3,496,557

SYSTEM FOR REPRODUCING RECORDED DIGITAL DATA AND RECOVERING DATA PROPER AND CLOCK PULSES

Leland Wayne Lowrance, Hawthorne, Calif., assignor to General Instrument Corporation, Hawthorne, Calif., a corporation of California Filed Feb. 1, 1967, Ser. No. 613,336
Int. Cl. G11b 5/00
U.S. Cl. 340—174.1 11 Claims

ABSTRACT OF THE DISCLOSURE

Digital data recorded on a magnetic surface are reproduced and double phase shifted, directly or indirectly, to produce two phase shifted, square wave trains with flanks occurring at signal maxima and minima. By comparing or combining the square waves two pulse trains, one for the maxima and one for the minima, are produced. The bit rate is recovered by suppressing pulses occurring earlier than the expected rate. The pulse trains are used separately and selectively to determine bit values.

The present invention relates to a data reproducing system. One of the most common types of data storage, particularly for the storage of digital data, uses the principle of magnetic recording; the record carrier being a magnetic tape, disk or drum. Modern requirements dictate high data densities so as to pack as much data in as small a storage space possible. Tapes, disks and drums as storage elements operate today in a manner that the recovery or reproducing of the data as recorded results in a data flow having a rate in the megacycle range. This imposes specific problems upon the recovery or reproducing system having primarily to do with introduction of noise.

It is common to record, for example, digital data on such a magnetic storage surface along a track and to magnetize the carrier longitudinally or vertically along the track, preferably at saturation levels, in one or the opposite direction, whereby each transition in the magnetization from one direction to the other one represents an item of significant information. If the recording scheme is such that for each, e.g., bivalued data bit there is at least one such transition with additional transitions provided to distinguish between the two possible bit values 0 and 1, then one can say that the information is recorded in a type of frequency modulation in which, so to speak, the carrier is the bit rate and the modulation provides for bit value distinction.

Upon reproducing the data, the storage carrier usually passes along a transducer, and any variation in the magnetization of the carrier induces a varying flux in the transducer which, in turn, produces an electrical signal. In particular, electric voltage peaks will be provided by the transducer for each such magnetic transition or flux reversal on the carrier as it passes the transducer. The output of the transducer, therefore, will be an alternating voltage which can be regarded as being an AC wave having a carrier frequency corresponding to the rate with which the bits pass the transducer heads at the particular storage carrier speed. This AC carrier wave is modulated in accordance with the bivalued data.

For recovering the recorded data it is now common to process this AC wave in various ways, including peak or level detection with direct threshold discrimination or integration, amplitude strobing in response to a system clock, differentiation of the output signal and other methods. The problem arises, however, that this AC wave, even though frequency modulated, does not have a constant amplitude. Wear and tear on the storage carrier, incomplete previous erasure, variations in the carrier speed, variations in distance and/or in the angle of attack of the storage carrier relative to the transducer during recording as well as during reproducing, external sources, they all produce distortions in the electrical output signal as it appears at the output side of the reproducing transducer. The conventional means of processing the reproduced signal directly, therefore, must be desensitized to a considerable extent in order to allow for such signal distortions. This, however, renders such a recovery system very susceptible to noise and the effective signal-to-noise ratio in the recovery system is very low and has low noise rejection capabilities.

The present invention obviates these deficiencies by processing the analog signal as provided by the transducer without signal level discrimination, time strobing, peak detection or differentiation. It is suggested to feed the output signal of the transducer, preferably after suitable amplification in a conventional manner, to an input of a comparator and to feed to the other input of this comparator the same signal but after having been delayed or phase shifted by a period which is small in comparison with the above defined carrier frequency. This comparator preferably has a steep input-output characteristic with easy saturation; it produces constant output signals for input signal differences above a very small threshold. In particular, therefore, the output signal of this comparator will be at a first level whenever the undelayed information signal is larger than the delayed one and the output of the comparator will be at a second level if the relationship is reversed.

The comparator thus produces a square wave type wave train, whereby steep flanks in the waves of this train occur always for a maximum and for a minimum in the information signal as provided by the transducer. These pulse flanks in the output signal of the comparator occur regardless of the particular values of these information signal maxima and minima, and they are, to a considerable extent at least, independent from the particular wave shape or curvature of the information signal in between two succeeding extreme amplitude values.

Next there is provided a means for providing a similar square wave signal but being delayed again by a small phase angle or delay period in relation to the first mentioned square wave. Otherwise the two square wave trains have similar configurations. This can be carried out, e.g., by directly delaying the first mentioned square wave or by processing the information signal directly in an analogous manner only with a different phase shift or time delay at one of the inputs of the then second comparator. In either case there are in existence two square waves having a phase difference between them which again is small in comparison with the unmodulated oscillation period of the information signal.

These two square waves are now processed by logic circuit means or by circuit means providing algebraic signal combinations which, for the purposes of the invention, can be regarded as equivalents. For example, the two square waves can be subtracted from each other in two possible ways with either subtraction being carried out in a manner that negative results are being suppressed. This can be carried out, e.g., by means of two comparators. The two comparators each receive the two square waves but the outputs are formed as complementary signals. Thus there will be produced two signal trains or, better, two pulse trains, each pulse having a width equal to the phase shift between the two square waves which is rather small. The pulses of each train occur only for one type of flanks of the square wave. Thus, the pulses of one train correspond to information signal maxima while the pulses of the other train occur at the time of information signal minimum.

These two pulse trains are now processed in two different ways. In one way, so to speak, the carrier is recovered, which in terms of digital data means that the processing involves production of clock pulses representing precisely the bit rate. The second way of processing involves recovery of the modulated signal or, in terms of digital technique, recovery of the bit values themselves.

The clock pulses are produced with the aid of an astable type element which, for example, can be a monovibrator of the simple or refined type and which can be triggered to provide a particular output signal for its astable period whereafter it returns to its normal and stable state until being triggered again. The astable period of this element, in the following also called the blanking generator, is now in excess of half the period of the expected bit rate period for the existing storage carrier speed; the astable period of the blanking generator is below, i.e., shorter, than the bit rate period itself.

The above mentioned two pulse trains are now used to trigger the blanking generator, but these pulses are permitted to operate as trigger pulses only when the blanking generator is in the stable state. This way the blanking generator will, in effect, be triggered at the bit rate, and the trigger pulses themselves can be used as clock pulses identifying the rate of occurrence of sequential bits.

The bit value recovery depends on the specific type of recording format used. For example, in case the so-called phase shift or Manchester type recording is used as the preferred mode of practicing the invention, the digital data can be recovered by providing a data flip-flop. The set and reset states of the flip-flop are controlled by the same pulse trains triggering the blanking generator. For example, the data flip-flop is being set by those pulses representing information signal maxima and which also are permitted to trigger the blanking generator, the data flip-flop is reset by all those signals representing information signal minima and which have also been permitted to trigger the blanking generator.

The advantages of the system described above are among others, the following. At no time is the system sensitive to any specific amplitude values of the information signal. The digital data are being recovered without employing signal differentiation, either of the information signals themselves or of any subsequently formed signal. The system provides its own clock. The blanking generator employed is not a clock and its astable period does not have to be as accurately maintained constant as a system clock normally is expected to be.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
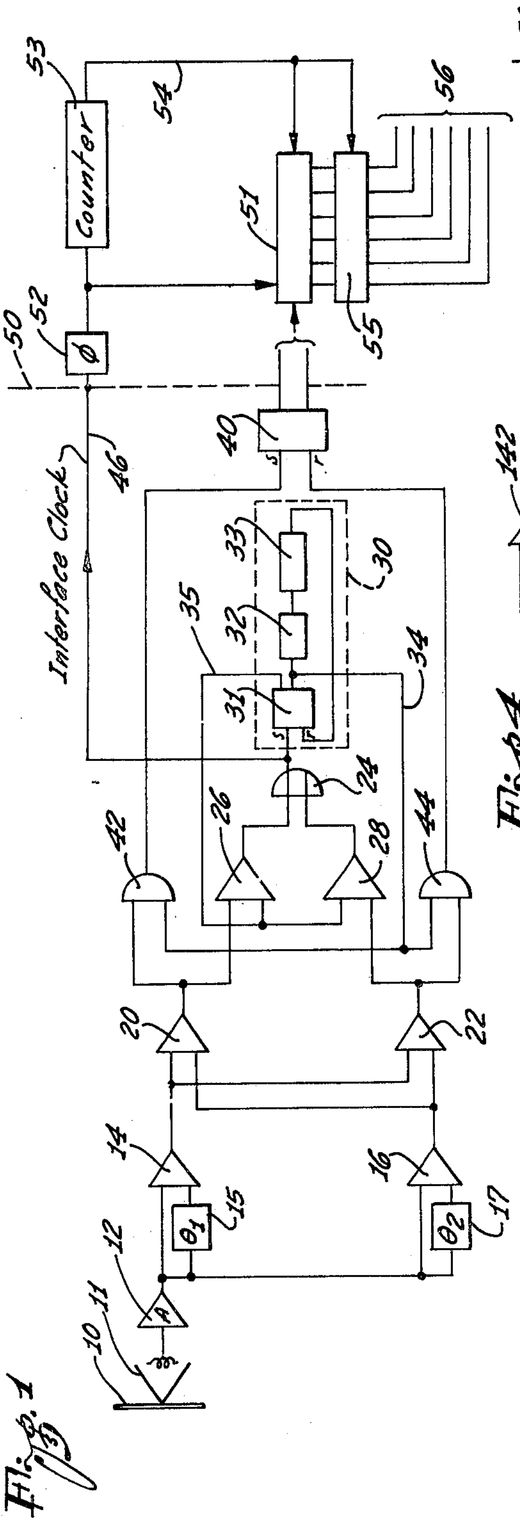
FIGURE 1 illustrates somewhat schematically a block diagram of the preferred form of practicing the present invention.

Proceeding now to the detailed description of the drawings, in FIGURE 1 thereof there is shown an embodiment of the preferred form for practicing the present invention. Reference numeral 10 denotes a magnetic storage surface pertaining, e.g., to a drum, a disk, a magnetic tape or the like, and being capable of retaining permanent magnetization for purposes of storing digital data. This surface may be provided to accommodate a plurality of recording tracks, but the invention can be practiced with any number of tracks including a single track. Hence, the invention will be described as to the reproducing of data recorded in a single track and independently from the existence of any other track.

For purposes of describing the present invention it is assumed, that the digital data has been recorded in the so-called phase shift or Manchester format. In FIGURE 2, line *a*, there is illustrated representatively a sequence of bivalued bits (1, 0, 1, 1, 1, 1, 0, 0, - - - - - ) and the representation of these bits on the recording track in terms of magnetic flux $\phi+$ and $\phi-$, preferably at saturation level. Thus, each bit of value 1 is represented by a flux transition $\phi+\rightarrow\phi-$, and each bit of value zero is represented by a flux transition $\phi-\rightarrow\phi+$.

The designations "plus" and "minus" are entirely arbitrary as to the particular directions of the magnetizations thereby identified. Thus, it is not necessary to require that, for example, $\phi+$ is the flux in one particular and necessarily known direction on the storage carrier 10. In other words, bit value 1 for example, will not be distinguished by determining first that the existing flux on the carrier increment is in fact flux $\phi+$ and by deciding subsequently that a flux change $\phi+\rightarrow\phi-$ must be 1 accordingly. Instead, a special code will be used on the track, preceding the data proper, and from the evaluation of that code the bit value distinction follows naturally and without requirement of determining first which particular flux direction on the carrier corresponds to the flux $\phi+$ as being the flux from which the flux is changed for recording the bit having the value 1.

Such data are reproduced in a conventional reproducing transducer 11 producing an electrical output signal fed to a suitable preamplifier 12. For the representative example of FIGURE 2, line *a*, the line *b* thereof denotes in the solid curve a train of voltages as it would appear, e.g., at the output side of amplifier 12. One can see from lines *a* and *b* of FIGURE 2 that each time the direction of magnetization has changed, i.e., each time a transition or flux reversal occurs on the magnetic recording surface, there is either a maximum or a minimum of the voltage in the signal train provided by the reproducing device, here the amplifier 12.

Intentionally now the line *b* in FIGURE 2 shows this voltage train in a rather irregular fashion. One "irregularity," of course, results from the information itself. An alternating bit sequence (- - - - - 1, 0, 1, - - - -) produces a signal, which for the chosen recording format has a frequency equal to the bit rate; sequences of like valued bits produce a signal of twice that frequency. Due to the fact that in most instances meaningful data will not be comprised of such regular bit sequences, the normal case is that the output signal changes between these two frequencies at an irregular rate. These "irregularities" are thus, in fact, information to be detected.

The second type of "irregularities" which can be noted in line *b* of FIGURE 2 is the rather wide change of amplitude levels plotted here by way of example. This is not information but may result from numerous factors; among them, for example, speed variations of the recording surface during recording and/or reproducing, external noise sources, minute variations in the distance between the recording surface and the transducer, again during recording as well as during reproducing. Still other sources for these signal distortions may come from incomplete erasure of previous recordings or from wear and tear of the recording carrier. Conceivably other factors materially influence the amplitude, i.e., the wave form of the signal in general further. The principle object of the present invention is to distinguish information proper from signal irregularities which are not information.

The wave train as derivable for amplifier 12 (FIGURE 2, line *b*, solid curve) is now processed as follows. At first it is fed directly to one input terminal each of two comparators, respectively denoted by reference numerals 14 and 16. Each of these comparators 14 and 16 has a second input terminal; the comparator 14 now receives as a second input the signal as derived from amplifier 12 but after having been phase shifted or delayed by a phase shifter or delaying device 15 for a particular phase angle $\theta 1$. The comparator 16 receives as its second input the output of a phase shifter 17 receiving also the signal from amplifier 12. Delay device 17 produces a phase shift $\theta 2$, whereby the phase shift angles $\theta 1$ and $\theta 2$ are, e.g., related in that $\theta 2$ is larger than $\theta 1$.

The dotted curve in line *b* of FIGURE 2 shows the output of phase shifter 15 which output is phase shifted by the angle $\theta 1$ relative to the solid curve which is the output derived directly from amplifier 12 and without delay. The dash-dot curve in line *b* of FIGURE 2 is the output of amplifier 12 after having been shifted or delayed by phase angle $\theta 2$. The phase angles $\theta 1$ and $\theta 2$ (or corresponding delay periods) are small relative to the highest information signal frequency period. $\theta$ may, e.g., be about one order of magnitude below a full cycle period of the highest information signal frequency that occurs.

The two comparators 14 and 16 are constructed rather similarly, and they have very steep input-output characteristics around an input signal difference of value zero, with easy saturation of its output for already not too large non-zero input signal differences. As stated, the comparator 14 compares the information signal itself with the same signal after having been shifted by the angle $\theta 1$. The output of the comparator 14, for example, is such that it provides a signal level zero whenever the direct signal of amplifier 12 as applied to comparator 12 is larger than the phase shifted signal (dotted curve in FIGURE 2, line *b*) concurrently applied thereto. Conversely, whenever the phase shifted signal is larger than the direct signal, the comparator 14 produces the output signal L, which may be the positive saturation signal level of comparator 14.

The signal levels zero and L may be opposite saturation levels and the comparators can be constructed to provide level zero for input signal difference zero as well as when the direct input signal exceeds by whatever amount the phase shifted signal, while output signal level L is produced whenever the phase shifted signal is larger than the direct signal above a given, small threshold.

Line *c* in FIGURE 2 denotes the representative output signal produced by comparator 14 when the input signals are as shown in FIGURE 2, line *b*. One can see by comparison now the following important aspects. If the information signal has a declining slope which inherently extends from a maximum to a minimum regardless of specific values of these maxima and minima, then a positive signal L is produced by comparator 14. Whenever the information signal has an inclining slope extending from a maximum to a minimum, and again regardless of the absolute values of the minimum and of the maximum, then the output signal from comparatar 14 is zero.

It is convenient to speak of signal changes O→L as being leading edges of a pulse, while signal changes L→O denote trailing edges. This, however, is an arbitrary designation because the chosen signal polarities are of no significance themselves. One can see from FIGURE 2 that in the square wave type signal train issued from comparator 14 leading edges of positive pulses are representative of information signal maxima and trailing edges thereof are representative of the occurrence of information signal minima. The occurrence of the maxima and minima is now the information which is inherently included in this square wave train as derivable from comparator 14, and this train of square waves is entirely independent from the values of maxima and minima of the information signal.

Figures 2X, 2Y, 2Z:
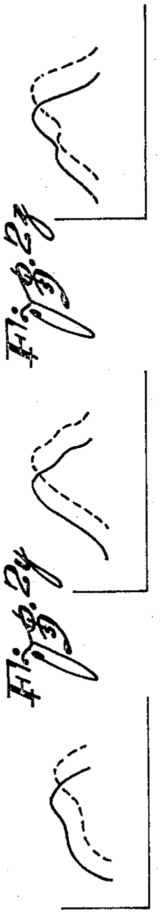
FIGURE 2 illustrates along several lines in vertical alignment pulse forms and signals as they occur in the circuit shown in FIGURE 1.
Figure 2:
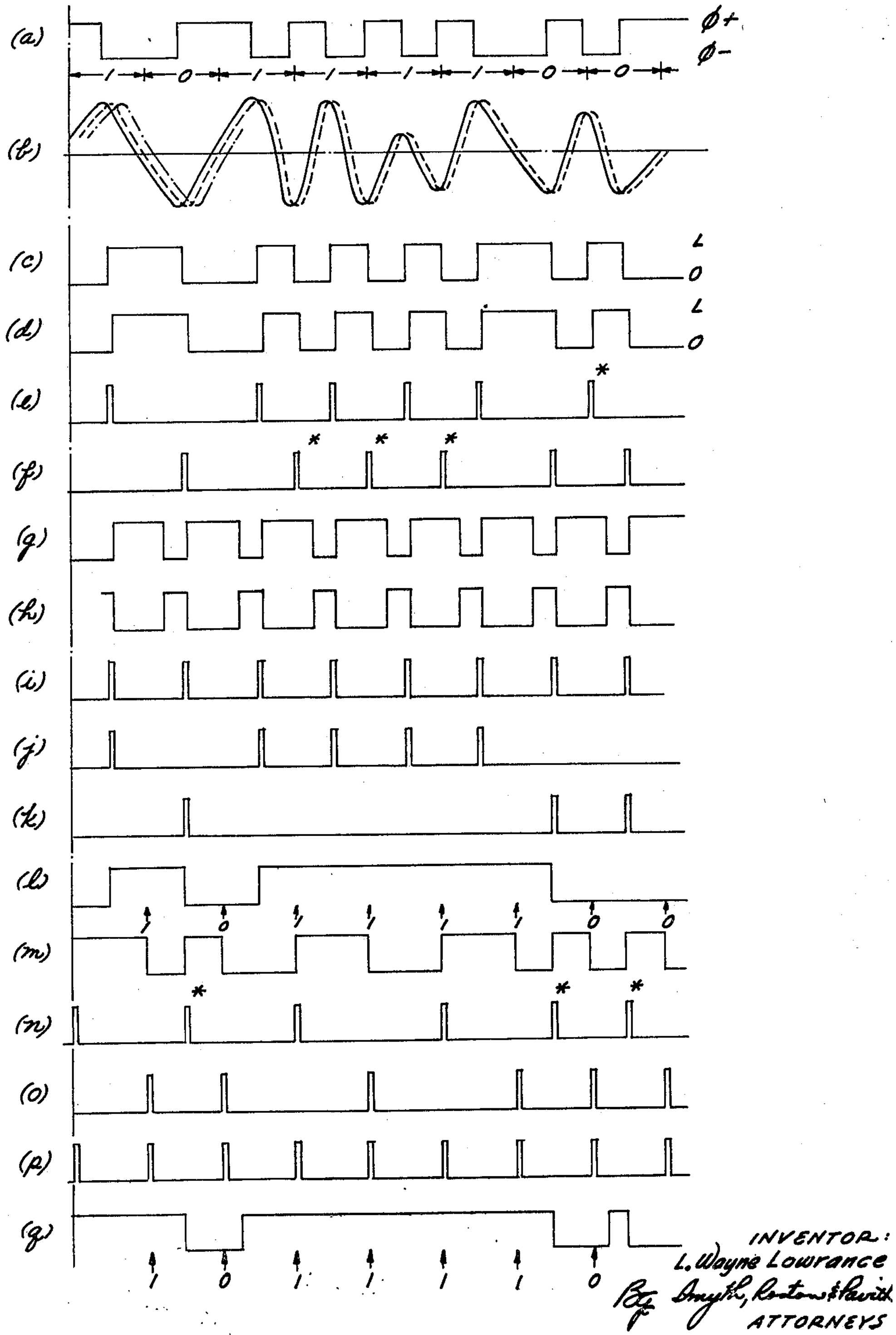

It is important, further, that the square wave train (FIGURE 2, line *c*) will be produced even if the information signal is severely distorted such as shown representatively in FIGURES 2X, 2Y and 2Z. One can see that the signals may have excessively variable slope, even small slope reversions, and still comparator 14 will produce signal transitions L→O and O→L only for true maxima and true minima of the information signals.

The comparator 16, as stated, receives the direct information signal from amplifier 12 and the phase shifted information signal, the phase shift being by phase angle $\theta 2$ which is larger than $\theta 1$. The resulting output of comparator 16 is shown in line *d* of FIGURE 2. The signal train as produced by comparator 16 is very similar to the signal train produced by comparator 14 except that the signal train produced by the comparator 16 is delayed by a phase $\theta 3$ equal to the difference between $\theta 2$ and $\theta 1$.

Figure 3:
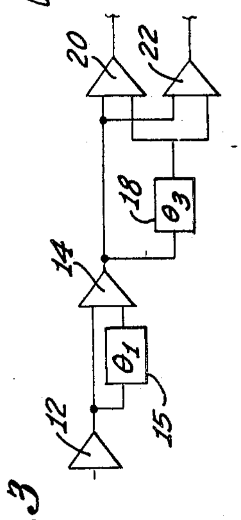
FIGURE 3 is a block diagram illustrating somewhat schematically a modification of the circuit shown in FIGURE 1.

Before proceeding with the description of FIGURE 1, it seems to be advisable to mention briefly an alternative mode of producing these two signal trains as shown in FIGURE 2, lines *c* and *d*. In FIGURE 3 the single comparator 14 receives the information signal directly from amplifier 12, and the phase shifted signal from phase shifter 15 as aforedescribed; the phase shift will also be $\theta 1$. The direct output of comparator 14 will thus be the same square wave signal train as shown in FIGURE 2, line *c*. The signal of FIGURE 2, line *d* can now be produced by phase shifting the output of comparator 14 by means of phase shifter 18 and for the phase angle $\theta 3$ which is equal to the difference of the above-defined phase angles $\theta 1$ and $\theta 2$.

The embodiment shown in FIGURE 3 requires one comparator less than the embodiment of FIGURE 1. However, the phase shifter 18 will inherently flatten somewhat the steep flanks of the transitions L→O and O→L of the pulse train. This flattening does not occur in the circuit shown in FIGURE 1. However, subsequent processing of the signals from comparator 14 and phase shifter 18 completely eliminates any flattening so that ultimately the performance of the two circuits will be similar in both cases.

Proceeding now to the processing of signals of the type shown in FIGURE 2, lines *c* and *d*, the signals are fed to two comparators 20 and 22. These two comparators operate as follows. The comparator 20 will produce a positive signal L if its input as derived from comparator 14 is larger than the concurrently applied input from comparator 16 (or from phase shifter 18), while the output of comparator 20 is zero if the output signal of comparator 14 is not larger (i.e., equal or smaller) than the output of comparator 16.

It is apparent that due to the small size of the phase shift in between the output signals from comparators 14 and 16, the signal levels as provided by the two comparators 14 and 16 will be similar most of the time except during the periods around leading and trailing edges of each of the square waves. In particular, the output signal from comparator 14 will be larger than the output signal from comparator 16 only after occurrence of a leading edge of the output signal from comparator 14 up to the time the delayed leading edge of a pulse L from comparator 16 arrives. This, in turn, is representative of an information signal maximum. During the trailing edges of the signal from comparators 14 and 16 the signal of comparator 14 is smaller than the signal from comparator 16, which, as one can see from FIGURE 2, occurs always when there is an information signal minimum. However, negative input signal differences are suppressed by the comparator 20.

The line *e* in FIGURE 2 now denotes the output pulses of comparator 20. It is a train of short pulses representing the occurrence of information signal maxima. The employment of a comparator with saturation characteristics as described above and having a near −0 input threshold eliminates any flattening the input signals may have experiences when the circuit of FIGURE 3 is used.

The relationship of the signals for the production of an output is reversed as far as the comparator 22 is concerned. Comparator 22 produces a positive signal at level L whenever the signal from comparator 16 (or from phase shifter 18) exceeds the output signal from comparator 14. When the two input signals are equal or when the output signal of comparator 16 is smaller than that of comparator 14, the comparator 22 will produce signal zero. Line *f* in FIGURE 2 shows the resulting output pulses of comparator 22, and it can be see that the occurrence of short pulses here is representative of the occurrence of information signal minima.

The comparators 20 and 22 realize by way of algebraic, negative summation the following logic operations. If one regards the pulses of short duration as produced by the comparators to be true signals and represented by the same symbol as the comparators providing them, and if one denotes symbolically the output states of comparators 14 and 16 when providing level L with like numerals, whole using $\overline{14}$ and $\overline{16}$ to denote signal level 0, then there are the logic relations $20=14\ \overline{16}$ and $22=\overline{14}\ 16$.

In summary, the two comparators 20 and 22 produce two respective signal trains, one signal train being directly representative of magnetic recording transitions or flux changes on the recording surface 10 in one direction, and the other pulse train is representative of the occurrence of magnetic recording transitions in the opposite direction. It is important that these two signal trains have been developed without requiring amplitude discrimination and without differentiation. Amplitude and duration of each of the output pulses of comparators 20 and 22 is independent from the quality of recording and of reproduction short of complete signal destruction. Thus, the reproduced information signal has been stripped of all non-essential components and the principle information left is the occurrence of such pulses in relation to the occurrence of others.

The absence of amplitude discrimination renders the system operative for very favorable signal-to-noise ratios and severe signal distortions. The same holds true, even more so, as far as differentiation or absence thereof of the signal itself is concerned. Likewise, the absence of any differentiation of any of the pulse and signal trains produced is significant in view of the fact that the pulse durations (outputs of 14 and 16) may well be in the below-microsecond range, in which case differentiation of leading and trailing edges would require extremely high power amplification for producing useful differentiation output pulses.

It will be observed further that no external clock signal has been needed, nor has there been used any amplitude strobing, integration or any of the other conventional reproduction means. The duration of each signal as shown in lines *e* and *f* in FIGURE 2 depends entirely on a fixed chosen constant, viz, the phase difference $\theta 3=\theta 1-\theta 2$. This has to be selected to be suitable under the circumstances but a wide degree of tolerance is permitted. The period of time corresponding to phase shift $\theta 3$ does not influence at all the reproduction of data itself, nor is it representative of or comparable with any external strobing signal. Each of these pulses is representative of an information signal maximum or minimum as far as its occurence in the reproducing circuit is concerned. It is entirely independent from any signal amplitude value or any previous or subsequent signal. Moreover, within the bandwidth capabilities of the elements and circuit components employed, these pulses as shown in lines *e* and *f* of FIGURE 2 are individually entirely independent from the speed with which the recording surface 10 travels past the transducer 11.

We now proceed to the description of the circuit used for demodulating, so to speak, the digital information which is included in the information signal train which, at this point, is represented by the several pulses supplied by comparators 20 and 22. This demodulation is carried out in steps. At first a clock pulse train is produced representative of the bit rate but independently from the bit values. Second, the bit values themselves are being determined. Only the second step is directly related to the particular recording mode or format employed. The circuit as described thus far and the clock pulse generation to be described next can be used for all recording schemes where there is at least one flux reversal per bit on the record carrier.

There is now provided a blanking pulse generator 30 comprised of, e.g., a flip-flop 31, a time responsive element or member 32 and a level detector 33 which produces a particular pulse whenever the time responsive element 32 has reached a particular level after having been triggered. The element 32 is normally maintained at a particular constant signal level but produces an increasing (or decreasing) signal when triggered. The output pulse of this pulse generator 33 is used to reset the flip-flop 31, and to thereby restore the normal level in element 32.

The time responsive element 32 may, e.g., provide a voltage which rises as long as a particular input voltage is applied, which input voltage is presently derived from the reset-output side of flip-flop 31 when set. Whenever flip-flop 31 is set the time member or element 32 "runs." Element 33 may be a Schmitt trigger driven from the time member 32 and triggered when the output of member 32 has reached a particular level after having begun to run. As stated, element 33 when triggered, provides, in turn, a reset signal for flip-flop 31. When flip-flop 31 is reset, the driving potential for the time member 32 is removed and it returns instantly, or at least approximately instantly, to its normal level and is clamped to said level until an energizing voltage is again applied from the reset output side of the flip-flop 31 when set. After the return of member 32 to its normal level Schmitt trigger is also deactivated and the resetting signal for flip-flop 31 is removed.

It will be noted that the element 30 as a whole has the characteristics of a monovibrator, but a more elaborate construction has been chosen because stabilization of this generator is rather critical. This, in turn, is due to the high degree of accuracy required for the response of the components when the data reproducing rate is in the megacycle range and even above. For slower rates simpler components such as a standard monovibrator may, in fact, be employed. It should be mentioned, however, that this higher degree of accuracy for blanking pulse generator 30 has only relative meaning, because the pulse rate frequencies envisioned here are in the megacycle range and normal standard type monovibrators are not that accurate. On the other hand the generator 30 does not have to have an accuracy comparable with the duration of the pulses provided by comparators 20 and 22 which is in the nanosecond range. Systems using amplitude strobing do, however, require clock accuracies in about that range.

The blanking pulse generator 30 and particularly the flip-flop 31 thereof is triggered from any signal derived through logic "or" gate 24 which in turn receives any of two input signals respectively provided by two comparators 26 and 28. The comparators 26 and 28 receive the true or set side output signals from flip-flop 31 through connecting wire 35. The second input signal for comparator 26 is derived from the comparator 20, while the second input signal for comparator 28 is derived from comparator 22. One can see, therefore, that any signal from comparator 20 or 22 is permitted to pass through comparator 26 or 28 only when flip-flop 31 is in the off or reset state, as only then can the signal from comparator 20 or 22 exceed the concurrently applied reference signal as derived from flip-flop 31. Whenever the generator 30 has been triggered, flip-flop 31 is in the set state for the period of time member 32 runs and until member 32 triggers the element 33 to reset flip-flop 31. The set side output signal of flip-flop 31 when set blocks passage of pulses through comparators 26 and 28. The reference signal level from flip-flop 31 has been chosen preferably to be larger than any of the signals derivable from comparators 20 and 22 at any instant, thereby positively exhibiting the passage of the signals from the comparator 20 or 22 through the comparators 26 and 28 when applied thereto.

If one describes the positive pulses from the comparators 20 and 22 with a similar designation, and by denoting the pauses with $\overline{20}$ and $\overline{22}$ respectively, and if one describes set and reset states of the flip-flops 31 by 31 and $\overline{31}$ respectively, it follows that the triger signals for generator 30 can be defined by the logic relation $20\ \overline{31}+22\ \overline{31}$, whereby the "or" gate 24 realizes the "or" function of that relation, and comparators 26 and 28 realize the two "and" functions. It can thus be seen, that the blanking pulse generator 30 can be triggered only if in a nontriggered state; if generator 30 is in the non-triggered state any of the pulse coming either from comparator 20 or from comparator 22 can trigger it.

This leads now to the significance of the astable period of generator 30, i.e., the period between triggering the time member 32 and the subsequent response of trigger element 33. That period must be shorter than the period corresponding to the expected bit rate, but larger than half of that latter period. For the phase modulation or Manchester type recording scheme or format, the astable period of generator 30 must be longer than the period corresponding to a flux transition rate on the record carrier corresponding to a sequence of similarly valued bits.

Line *g* in FIGURE 2 illustrates now the output of the blanking generator 30 as derivable therefrom through the line 35; in other words, FIGURE 2, line *g* shows the set side output signal of the flip-flop 31. Line *h* in FIGURE 2 shows the signal derivable through a line or wire 34 from the reset output side of flip-flop 31. By comparing lines *e* and *f* of FIGURE 2 with lines *g* or *h* thereof, one can see that some pulses from the comparator 26 and 28 can trigger the blanking generator 30, but those pulses occurring after the generator is triggered and before it is being reset, are suppressed. The permitted trigger pulses are shown in line *i* of FIGURE 2, while the pulses in line *e* and *f* which are suppressed are denoted therein by an asterisk.

Either the output of "or" gate 24 or of the flip-flop 31, or of trigger element 33 can be used as data clock pulse. The output pulse train of either element represents the bit rate of the reproduced data. Presently a clock pulse line 46 receives the clock pulses from "or" gate 24 as representation of the reproducing rate for the several bits. Now we proceed to the description of the circuit for distinguishing among two possible values a bit may have.

The signal train in line 34 which is shown in FIGURE 2, line *h*, is used for purposes of controlling the data flip-flop 40. The data flip-flop 40 is controlled through two "and" gates 42 and 44. Each of these two "and" gates receives the pulse train in line 34 as gating pulses. Thus, the gates 42 and 44 are open during the normal or stable period of the blanking pulse generator 30, but during the astable periods thereof the gates 42 and 44 are closed or blocked. The pulses permitted to pass through gate 42 and used to set flip-flop 40 can thus be expressed by the logic equation $20\ \overline{31}$. Pulses permitted to pass through gate 44 and to be used to reset flip-flop 40 can be expressed by the logic relation $22\ \overline{31}$. Lines *j* and *k* of FIGURE 2 respectively show the pulses permitted to pass through the gates 42 and 44. These pulse trains are respectively similar to the ones produced by comparators 26 and 28; in other words, comparator 26 and "and" gate 42 produce similar outputs and both are shown in line *j* of FIGURE 2, while comparator 28 and "and" gate 44 produce similar outputs which are shown in line *k* of FIGURE 2. Some consideration will be given below to this redundancy.

By comparing again line *e* of FIGURE 2 with line *j* thereof, and line *f* with line *k*, one can see that the pulses in lines *e* and *f* and denoted with an asterisk are also being blanked and excluded from the control of data flip-flop 40 is set or reset only at the clock pulse rate. For the specific examples of data shown in FIGURE 2, line 1 thereof represents the resulting state of flip-flop 40.

The fact that some pulses of comparators 20 and 22 are being suppressed for both clock pulses and data production does not mean that their significance is being disregarded. By comparing lines *e* and *f* of FIGURE 2, with lines *j* and *k* thereof, one can see that for each suppressed pulse the respectively immediately succeeding and preceding pulses which are not suppressed come from the same comparator (20 or 22) and thus represent both maxima or minima. When in between two effective, i.e., non-suppressed pulses there is no additional pulse which is being suppressed, then these two succeeding and effective pulses represent opposite extreme amplitude values, one being a maximum and one being a minimum of the information signal. This way the phase modulation of the recording is in effect demodulated.

The output side of data flip-flop 40 may now conveniently be used for purposes of data sampling. Thus the data flip-flop 40, together with the clock pulses in line 46, can be used to control the reception of data by equipment external to the equipment which has been described. Reference numeral 50 denotes this equipment interface; to the left thereof, in the drawing, is shown the data reproducing unit in accordance with the present invention and to the right of this interface 50 is the external unit to which the data reproducing unit may be connected.

In order to provide an example, the output of flip-flop 40 may be applied to the serial input side of a shift register 51. A phase shifter 52 responds to the interface clock pulse from line 46. After a slight delay, i.e., after any possible change in state of data flip-flop 40, the content thereof is serially shifted into the shift register 51. It may be desirable to transfer six bits as a single, 6-bit-character in parallel to the device processing this digital information, and thus there is provided a counter 53 which counts up to six pulses from the clock. From each count-6 the output line 54 of counter 53 provides gating pulses to an output gate assembly 55 which permits the transfer in parallel of the six bits then held in character register 51 to corresponding six output channels 56 and for further utilization.

It can thus be seen that the system in accordance with the present invention operates without amplitude discrimination, without strobing of any analog signal, without requiring frequency sensitive elements, without requiring signal or pulse differentiation, without requiring information signal detection, e.g., by means of integration or threshold level detection. The time constant of the time member 32, i.e., the astable period of the blanking pulse generator 30 is the single time reference employed and one can readily see that its constancy, i.e., duration tolerances depend upon the speed variations the record carrier may undergo. To the extent the record carrier speed is kept constant the blanking pulse generator output period may vary and vice versa. All other signals are generated directly out of the information signal as it has been read from the magnetic storage surface, including extensive noise, but the processing scheme eliminates that noise.

The particular data example plotted in FIGURE 2 includes another aspect of the present invention which is related to the format employed for recording the data on the track. It is assumed, in fact, that the signal train shown in lines *a*, *b*, etc., of FIGURE 2 is the beginning of a data track. This signal train includes what can be described as a coded preamble, which is defined as a four-bit code 1011. The purpose thereof is to provide three sequential magnetic transitions resulting in three pulses at the output sides of comparators 20 and 22 taken together, with no suppressed pulses in between. This is the self-synchronizing aspect of the system as mentioned above which obviates the requirement of preassigning flux directions with bit values.

Should, for any reason, the first transition be insufficiently developed to produce a pulse, or should it be distorted severely to produce a pulse at the wrong time, the system will still synchronize properly as the first three transitions follow exactly at bit rate. In case the data would begin with two similarly valued bits, and upon loss of the first transition, the system would try to synchronize to the wrong phase and soon an error would result. By using the above defined preamable (or the complementary signal 0100) it is assured that the first three pulses (or at least two thereof) produced by comparators 20 and 22 establish a pattern defining from the beginning the right phase for the data clock as derivable exactly from the recording itself.

It should be mentioned now that from standpoint of circuit logic the elements 26 and 28 on one hand, and elements 42 and 44 on the other hand, represent redundancies. Thus, it is basically possible to control the data flip-flop 40 with the output as provided, e.g., by comparator 26, and to control the reset input side of the data flip-flop 40 from the output of comparator 28. The separation of the several signal paths at an early point, however, improves the signal-to-noise characteristics of the circuit. In addition, it is made possible to employ set side output signals as well as reset output signals of the flip-flop 31 for control purposes, instead of having a single output ultimately controlling two flip-flops, and the clock. This leads also to one of the reasons why elements 26 and 28 are comparators rather than simple "and" gates. Briefly, the two comparators 26 and 28 could be substituted by simple logic "and" gates, in which case then the reset output side of the flip-flop 31 would be used also for gating such "and" gates as the result would be the same. However, as stated above, it is inadvisable to control too many elements and gates from just one flip-flop output side. Thus, utilization of set and reset outputs of flip-flop 31 is also preferred here, and, therefore, comparators rather than "and" gates are employed.

The invention is not limited to the particular recording format as described above. For example, when the so-called frequency doubling method is used, then each bit cell on the record carrier is defined by one magnetic transition, i.e., flux reversal. For each bit having value "zero" there is another transition, while such additional transition is absent for bits having value "one." The particular bit sequence shown in FIGURE 2, line *a* would then be represented by a flux pattern as shown in FIGURE 2, line *m*. Lines *n* and *o* show the resulting pulses at the output side of comparators 20 and 22, respectively. Line *p* in FIGURE 2 shows the clock pulses and trigger pulses from the blanking generator 30 in this case. Thus the clock pulse generation is exactly the same as aforedescribed. The only difference is in the data assembly.

Figure 4:
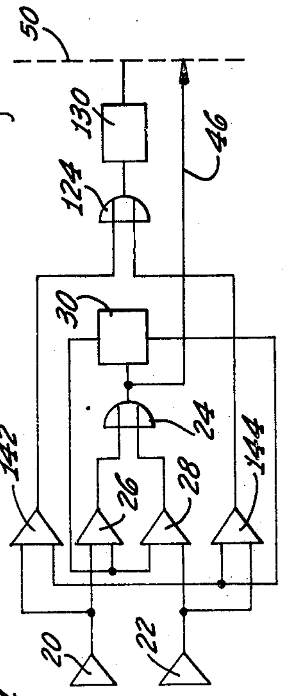
FIGURE 4 illustrates a modification of the circuit diagram shown in FIGURE 1 and related to a different data demodulator.

For example, two comparators 142 and 144 in FIGURE 4 respond to the signals in output line 34 of generator 30 as well as to the output signals from comparators 20 and 22. The outputs of the comparators 142 and 144 are combined in an "or" gate 124. It follows from the complementary nature of controlling comparators 142 and 144 as compared with the control of comparators 26 and 28, that the output pulses of "or" gate 134 are those, and only those, which have been suppressed in gates 26 and 28. Hence, these output pulses of gate 124 denote the additional, bit-value-"zero"-defining transitions of the recording.

The output pulses of "or" gate 124 are used to trigger a second generator 130 having a similar time constant (and being possibly similarly constructed) as generator 30. When the astable state of generator 130 coincides with the clock pulse from line 46, bit value "zero" is defined; when the stable state of generator 130 coincides with a clock pulse in line 46, a "one" is defined. For further evalution a phase shifter such as 52 in FIGURE 1 is not required. For this type of modulation one will preferably employ several "ones" as preamble.

What is claimed is:

1. A digital data reproducing system for cooperation with movable storage means having characteristics variable in representation of digital signals, there being a transducer coupled to the storage means for producing oscillating electrical signals representative of the digital signals, comprising:

first means responsive to the electrical signals produced by the transducer and delaying the signals by a period short in relation to the duration of the shortest half-wave of the oscillation signal;

second means connected for combining algebraically delayed and undelayed signals to produce a signal train variable between a first and a second level, with each level change occurring at a maximum or minimum of said electrical signals irrespective of the values thereof;

third means for deriving from said signal train a first sequence of pulses respectively representative of the occurrence of each level change from the first to the second level, or vice versa;

fourth means for deriving from those of the pulses of the sequence exceeding a minimum spacing a second, regularly occurring sequence of pulses as clock pulses; and fifth means for combining the first and second sequences of pulses for obtaining a signal train defining a sequence of bivalued bits at clock pulse rate.

2. A system as set forth in claim 1, the third means including means responsive to one of the delayed and undelayed signals and providing a differently delayed signal, further including means to negatively combine algebraically and differently delayed signal with one of the delayed and undelayed signals, to produce a second signal train, and means to negatively combine algebraically the first and the second signal train to produce the first pulse sequence.

3. A system as set forth in claim 1, the third means including means for delaying the signal train by a period having duration comparable with the delay provided by the first means, and further including means for negatively combining algebraically the delayed and the undelayed signal train to produce the first pulse sequence.

4. In a digital data reproducing system for cooperation with a movable storage means having characteristics variable in representation of digital signals in a self-clocking format, there being a transducer coupled to the storage means for producing oscillating electrical signals representative of the digital signals, a circuit for recovering clock pulses, comprising:

first means responsive to the electrical signals produced by the transducer and producing a signal train variable between a first and a second level with each change between levels occurring at a maximum or minimum of said electrical signals irrespective of the values thereof;

second means for producing a second signal train, similar to said first signal train but being phase shifted by a phase value less than the period between any two sequential level changes in the first signal train;

third means for algebraically combining the first and second signal trains to produce a first sequence of pulses representative of changes from the first to the second level and to provide a second sequence of pulses representative of changes from the second to the first level;

fourth means for remaining in a particular state of predetermined duration upon response to a trigger signal;

fifth means responsive to said pulses for providing trigger signals to said last mentioned means when said last mentioned means is not in the particular state; and means for deriving from the trigger signals the reconstructed clock pulses.

5. A system as set forth in claim 4, including, in addition bistable circuit means controlled by said first and second pulses occurring when said fourth means is not in the particular state to reconstruct the digital data.

6. A system as set forth in claim 5, said storage means holding a data track which, at its beginning, holds a particular digital representation so that said oscillating signal has precisely half the data rate frequency.

7. A digital data reproducing system for cooperation with a movable storage means having characteristics variable in a representation of digital signals, there being a transducer coupled to the storage meas for reproducing oscillating electrical signals representative of the digital signals, comprising:

first means responsive to the electrical signals produced by the transducer and producing a signal train variable between the first and the second level, with each change between levels occurring at a maximum or minimum of said electrical signals irrespective of the values thereof;

second means for producing a second signal train similar to said first signal train but being phase shifted by a phase value less than the period between any two sequential level changes in the first signal train;

third means for algebraically combining the first and second signals trains to produce a first sequence of pulses representative of changes from the first to the second level and a second sequence of pulses representative of changes from the second to the first level;

fourth means for deriving from the pulses of the first and second sequences a third, regularly occurring sequence of pulses as clock pulses; and fifth means for combining the first and second sequences of pulses for obtaining a signal train defining a sequence of bivalued bits.

8. A system as set forth in claim 7, said third means including a first logic element providing the first sequence of pulses, with each pulse thereof being produced when the signals of the first and second trains represent a particular combination of opposite;

said third means including a second logic element providing the second sequence of pulses, with each pulse thereof being produced when the signals of the first and second trains represent the complementary combination of opposite states.

9. A digital data reproducing system for cooperation with a movable storage means having characteristics variable in representation of digital signals, there being a transducer coupled to the storage means for producing oscillating electrical signals representative of the digital signals, comprising:

a phase shifter responsive to the electrical signals produced by the transducer for producing a delayed electrical signal of substantially similar contour as the undelayed electrical signal as applied to the phase shifter, the effective phase shifting being small in relation to the smallest significant oscillation period of said electrical signal;

a comparator responsive to the undelayed electrical signal and to the delayed signal as provided by the phase shifter to produce a first, square wave type output signal variable between two levels, the level at any instant depending on the sign of the difference between the two signals to which the comparator is responsive;

means for producing a second square wave output having a fixed non-zero phase relative to the first square wave output, the phase being small in relation to the shortest period corresponding to the highest rate of level change of the first square wave signal;

means for algebraically combining the first and the second square wave signals to produce a first sequence of pulses representative of the leading edges of each of the first square wave and for producing a second sequence of pulses representative of trailing edges of the first square wave;

means for deriving from the pulses of the first and second sequences a third regularly occurring sequence of pulses as clock pulses; and means for combining the first and second sequences of pulses for obtaining a signal train defining a sequence of bivalued bits.

10. A system as set forth in claim 9, said means for producing a second square wave comprising:

a second phase shifter also responsive to said electrical signal to produce a second delayed signal, the effective delay with response to the electrical signal as provided by the transducer being different from the delay produced by the first phase shifter; and a second comparator responsive to the output of the second phase shifters and one of said electrical signals not provided by the second phase shifter to produce the second square wave.

11. A system as set forth in claim 9, said means for producing a second square wave comprising:

a second phase shifter connected to the output side of said comparator for receiving the first square wave signal and shifting same.

References Cited

UNITED STATES PATENTS

| | | | |
|---|---|---|---|
| 2,994,853 | 8/1961 | Astrahan | 340—174.1 |
| 3,217,183 | 11/1965 | Thompson | 328—116 |
| 3,243,580 | 3/1966 | Welsh | 340—174.1 |
| 3,299,414 | 1/1967 | Sims | 340—174.1 |

JAMES W. MOFFITT, Primary Examiner

VINCENT P. CANNEY, Assistant Examiner

U.S. Cl. X.R.

328—115